United States Patent [19]
Fraser

[11] Patent Number: 5,606,796
[45] Date of Patent: Mar. 4, 1997

[54] TURBINE BLADE REPAIR

[75] Inventor: Michael J. Fraser, Badgeworth, United Kingdom

[73] Assignee: Turbine Blading Limited, Shipston On Stour, United Kingdom

[21] Appl. No.: 335,794
[22] PCT Filed: May 11, 1993
[86] PCT No.: PCT/GB93/00967
§ 371 Date: Feb. 8, 1995
§ 102(e) Date: Feb. 8, 1995
[87] PCT Pub. No.: WO93/23198
PCT Pub. Date: Nov. 25, 1993

[30] Foreign Application Priority Data

May 12, 1992 [GB] United Kingdom ............... 9210191

[51] Int. Cl.$^6$ ................................................ B23P 15/00
[52] U.S. Cl. ................... 29/889.1; 29/889.7; 228/119
[58] Field of Search .................... 29/889.1, 889.7, 29/407, 889; 228/103, 119

[56] References Cited

U.S. PATENT DOCUMENTS

| | | | |
|---|---|---|---|
| 5,210,946 | 5/1993 | Monroe | 29/889.1 |
| 5,351,395 | 10/1994 | Crawmer et al. | 29/889.7 |
| 5,448,828 | 9/1995 | Willems et al. | 29/889.1 |

*Primary Examiner*—Irene Cuda
*Attorney, Agent, or Firm*—Armstrong, Westerman, Hattori, McLeland & Naughton

[57] ABSTRACT

A method of repairing a turbine blade which includes performing a heating operation on the blade in which the blade is heated to achieve a predetermined temperature distribution, sensing the temperature of the blade at least at one position by temperature sensing means and controlling the application of heat in accordance with the temperature determined by said at least one sensing means and monitoring the temperature of the blade at a location adjacent said at least one position with a monitoring means.

20 Claims, 3 Drawing Sheets

TURBINE BLADE REPAIR

This invention relates to a method of repairing turbine blades.

In use, turbine blades are subject to at least one of erosion damage and cracking due to high stress in the blade.

The tip of a turbine blade in a rotor assembly is the part of the blade which experiences maximum velocity and is hence the part subject to the greatest erosion.

The present invention relates primarily but not exclusively to blades used in steam turbines. Erosion or damage of steam turbine blades generally occurs following contact between the turbine blades and either particles carried by the steam or water droplets.

Damage can occur from metal or other solid particles, for example boiler scale, entering a steam turbine with the steam flow and striking the blades. Water droplet damage is generally restricted to the final stages of a turbine. However, all stages of a turbine can be affected by particle damage.

The rate of erosion of turbine blades is dependent upon the relative speeds between the blades and the particles or water droplets causing the erosion and it is generally the leading edge at the outer end of each blade that is most prone to erosion by impact.

At low pressure end of a steam turbine the steam is at a lower temperature having been cooled during passage through the turbine and at the dew point water droplets precipitate giving rise to "wetter" steam. The transfer of energy by impact in the turbine blades of the steam is therefore greater at the lower pressure end than at the high pressure end of the turbine. Once again it is predominantly the outer ends of the blades which are especially subject to erosion.

To reduce the rate of erosion, it is usual to provide a shield at the leading edge of the outer end of the turbine blade, such a shield being made from a material harder than the blade material.

Steam turbine blades may be made from many suitable materials, a typical example being a 12–13% chrome steel and the shield may be made from stellite or a suitably hardened steel. The shield may be brazed or welded to the blade.

After a period of use it is often found that the shield has been considerably eroded and one accepted method of repair is to first remove the old shield and secure a new shield in place either by brazing or welding the new shield to the blade or building up a new shield depositing fused metal in a welding operation. The blade is then machined in the area of the repair to return it to its original aerofoil profile.

Cracks in turbine blades due to stress in the blade usually occur at stress concentrations and notches found near discontinuities in the blade aerofoil or root section.

Turbine rotors generally speaking have two types of blades:

(a) Free-standing, secured to the rotor only at the root but which have no connection between adjacent blades;

(b) "Tied" blades which are additionally connected to each other by cover bands connecting each blade by tenons at the end of the blade secured to a shroud passing round the ends of all the blades, or "lacing wires" which pass through holes in the blades, each blade being brazed or otherwise secured to the lacing wires. Some turbine blades are provided with snubbers, snubbers being projections from the lower and upper surfaces of the blade to connect with similar projections from the upper and lower surfaces of adjacent blades.

Repair of the two types of turbine blades involving welding or brazing steps may lead to deformation of the blades. In the case of free-standing blades the blade is allowed to deform during the application of heat from the welding or brazing stage and thereafter may be mechanically returned to its original shape, i.e. by bending. With blades which are tied to each other by lacing wire, snubbers, etc., the application of substantial thermal energy to the blade during a welding or brazing operation does not deform the blade to such an extent since unrestricted movement of the blade is not permitted due to the presence of the lacing wires, etc. Since the blade is not able to freely move considerable stress is imparted to the blade the problems associated with such stress not being apparent until operation of the turbine when cracks may appear in the stressed areas.

It has also been found that even with blades that are freestanding the mechanical force needed to return the blade to its original form itself imparts stress to various areas of the blade which can lead to premature failure of the blade.

The problem of premature cracking of the blade after repair occurs with both types of blades mentioned above and is associated with any type of repair to the blade in which substantial thermal energy is applied to the blade normally during a welding or brazing operation.

For these, and other reasons, repair of a turbine blade may require performing a heating operation on the blade in which the blade is heated to achieve a predetermined temperature distribution.

The heating operation may be performed as a preheating operation before the welding operation or during or after the welding operation, for example as an annealing or stress relief operation.

It is important that the heating operation is performed so that the blade is heated accurately to achieve the predetermined temperature distribution and to this end temperature sensing means are provided disposed at positions so as to sense the temperature of the blade at said positions and thereby to control the application of heat so that the predetermined temperature distribution is achieved.

However, if the above mentioned temperature sensing means fail accurately to sense the temperature at one or more of said positions the application of heat is incorrectly controlled and the predetermined temperature distribution is not achieved. Even if incorrect heating is noticed, for example, as a result of the blade area concerned glowing at different colour to other blade parts, it is necessary to heat treat that blade after the other blades and this can incur a long time delay, for example of 12 hours.

An object of the invention is to provide a method of repairing a turbine blade in which the above mentioned problem is overcome or is reduced.

According to the present invention we provide a method of repairing a turbine blade which includes performing a heating operation on the blade in which the blade is heated to achieve a predetermined temperature distribution, sensing the temperature of the blade at least at one position by temperature sensing means and controlling the application of heat in accordance with the temperature determined by said at least one sensing means and monitoring the temperature of the blade at a location adjacent said at least one position with a monitoring means.

Preferably the method comprises the steps of applying heating means to selected areas of a turbine blade to be repaired, heating said areas of the turbine blade to desired temperatures, sensing the temperature of the blade at positions associated with said areas by respective temperature sensing means, and controlling the application of heat by said heating means in accordance with the temperature determined by the respective temperature sensing means and monitoring the temperature of the blade at a location adjacent each of said positions with said monitoring means.

The monitoring may be performed with a temperature sensitive device separate from a temperature sensing means by which the temperature at said at least one position is sensed.

The monitoring may comprise the manual monitoring of an indicating means. The indicating means may comprise at least one of an audible and a visible alarm signal. The indicating means may be activated as a result of the temperature sensitive device sensing that the temperature of the blade at said location lies outside said predetermined temperature distribution.

Alternatively or in addition, the monitoring means may include a visual display unit which may indicate the temperature sensed by the monitoring means and/or provide a historic record of temperature displayed against time.

The monitoring means may provide a control signal to a heating unit to disable or otherwise control the heating unit if the temperature sensed by the monitoring means lies outside predetermined range.

The monitoring means may be substituted for the temperature sensing means to control the application of heat, for example, if the temperature sensing means fails or is inaccurate.

The monitoring means may be disposed in a predetermined relationship to said at least one temperature sensing means and the monitoring means may be responsive to a temperature sensed by the monitoring means which is related to the temperature sensed by the associated sensing means in a predetermined manner.

The method of repair may be carried out in situ, for example, without removal of the blade from its rotor or its stator as the case may be.

The method may include the step of carrying out a repair step on said blade which involves the application of substantial thermal energy to the turbine blade.

The method may comprise a welding or brazing operation.

The welding operation may comprise the deposition of weld metal to rebuild a part of the blade and/or the welding operation may comprise making a welded joint to join a repair element to a residual part of the blade.

The method of repair of the present invention is suitable for many repairs requiring a welding or brazing step such as welding or brazing cracks in a blade and/or re-building by welding or brazing and/or securing by welding or brazing a hard metal shield at the outer end of the leading edge of a turbine blade.

The method of repair may comprise the steps of removing metal from the turbine blade in the area of a crack or other defect, replacing the removed material with metal in a fused state by a welding or brazing operation and/or by securing an insert of solid metal to the blade by a welding or brazing operation.

The blade may be heated in a controlled manner to a predetermined desired temperature before and/or during and/or after the repair operation.

If desired, before, during or after the repair operation, heat may be applied to the turbine blade and the turbine blade may be maintained at a temperature, or a series of different temperatures, for a predetermined length of time such as to eliminate or substantially reduce, stress present in said blade.

The turbine blade may be maintained at a predetermined temperature during the welding or brazing operation.

The method may include the step of removing a surface layer from at least part of the blade and then performing a hardness testing operation to determine a desired temperature distribution.

The blade may have been thermally hardened prior to removing said surface layer.

A plurality of blades may be repaired by first achieving a desired temperature distribution for a sample blade by determining a heating specification by selecting, positioning and energising at least one heating means on the sample blade, for example empirically, and then applying a similar heating specification to each other blade.

The determination of the heating specification of the sample blade may be performed whilst heating the sample blade to a temperature below that in which a metallurgical effect occurs on the blade.

The sample blade may be provided with a plurality of monitoring means, at spaced positions thereon, associated with a single temperature sensing means and associated heating means, whilst each other blade may be provided with a lesser number of, preferably only one, monitoring means associated with a single temperature sensing means and associated heating means.

Conveniently, electrical heating means are provided to heat the turbine blade to the required temperature.

Control of the temperature of the turbine blade by the use of electrical heating means enables satisfactory control of the desired temperatures to be achieved.

The invention will now be described in more detail by way of example with reference to the accompanying drawings, wherein.

Figure 1:
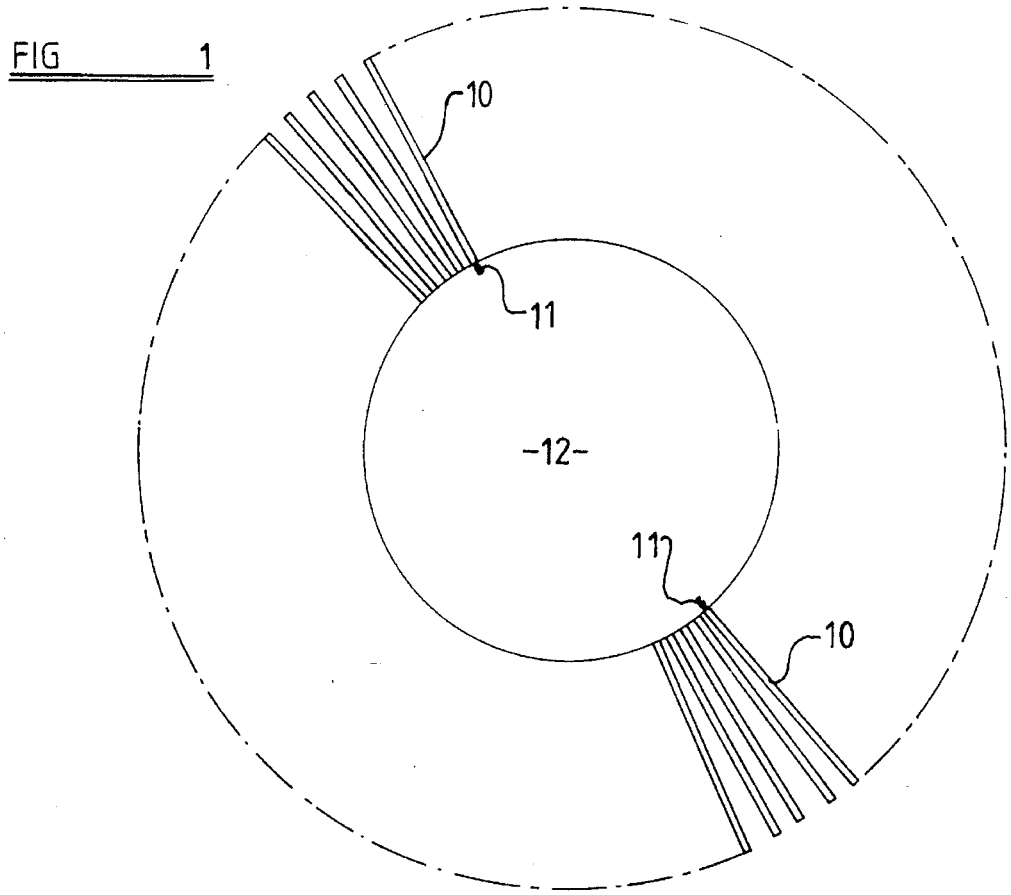
FIG. 1 is a front elevation of a turbine rotor assembly.

FIG. 1 illustrates an example of a rotor from a turbine and comprises a plurality of turbine blades 10 having a root part 11 by which the turbine blades are attached to a rotor 12. The blades may be interconnected by lacing wires and at their outer ends may be connected to a shroud by tenons in conventional manner.

The turbine blades may be made from a variety of material depending upon the functional operating conditions of the turbine. A typical material from which a blade in a steam turbine may be manufactured is chrome steel with approximately 12–13% chromium by weight.

Figure 2:
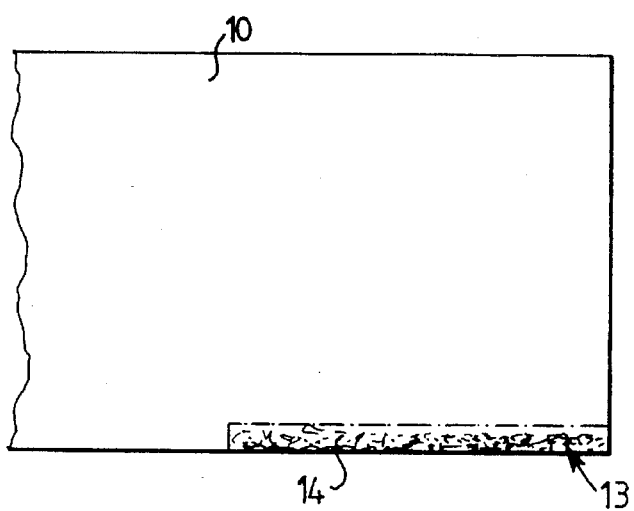
FIG. 2 is a view of an end region of a turbine blade of the assembly of FIG. 1.

Referring now to FIG. 2 the area of the turbine blade most prone to erosion is illustrated as being the leading edge 13 of the outer end of the turbine blade. It is this part of the blade which collides with steam or particles carried thereby during use of the turbine and which also has the greatest peripheral velocity being the radially outermost point from the axis of rotation. The area where erosion is most likely to occur is illustrated at 14 in FIG. 2.

Such a turbine blade can be repaired in a number of different ways depending upon the particular circumstances. The modes of repair include removing material, for example by grinding, from the turbine blade in the region 14, the amount of material being removed ensuring that all the damaged material is removed. A new hard shield is then built up by deposition of fused metal in a brazing or a welding operation. The hard material may, for example, be stellite.

Alternatively, material may be removed by grinding or cutting from the turbine blade bordering the leading edge 13, again removing all the damaged material, and then welding in place an insert of suitable solid material. For example, a composite insert having a leading edge shielded with hard material such as stellite and a trailing part of material compatible with the parent material of the blade and welded thereto.

Figure 3:
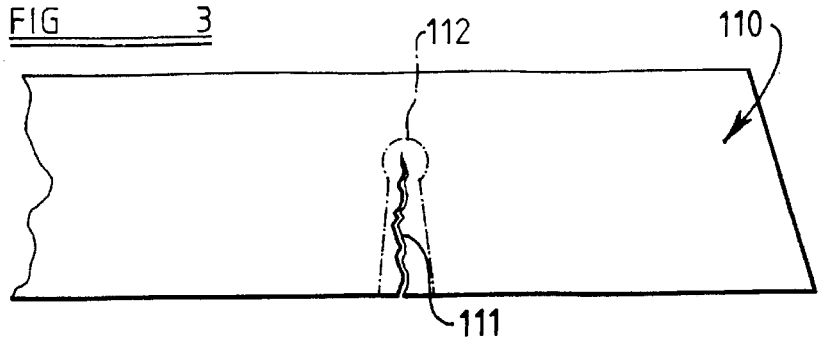
FIG. 3 is a view of an intermediate part of a turbine blade of the assembly of FIG. 1.

Referring now to FIG. 3 a turbine blade is shown at 110 in which a crack 111 has occurred. Such a blade is repaired by removing material from the crack as shown by the chain dotted line 112 to form a slot. After the slot has been formed it is closed by deposition of weld material. Thereafter the blade is machined to remove excess weld material and provide a blade of the desired shape.

In all of the repair methods described hereinbefore, and in other repair methods which may be used, it is necessary to heat the blade. The blade may be preheated, and/or during and/or after the performance of a welding or brazing operation.

The temperature to which different parts of the blade are heated will depend upon the material from which the blade is made, the dimensions of the blade and the type of repair to be carried out.

The repair method illustrated in FIG. 2 may involve pre-heating the blade, for example, to a temperature of about 400° C. in the repair area, whilst different parts of the blade may be heated to different temperatures which may be higher or lower. The repair method illustrated in FIG. 3 may be performed with a pre-heating step of raising the blade to, for example, approximately 200° C.

Where appropriate, the blade may be heated before, during or after completion of the welding operation, for example to a temperature lying in the range of 700° C. to 800° C. for a predetermined length of time to relieve the blade of any residual stress.

Material used for the welding process may be of any suitable material compatible with material from which the blade is made, which as mentioned above, may be 12%–13% chromium steel. Alternatively the welding material may comprise an alloy capable of bonding satisfactorily to the parent metal of the blade by which welding material is inherently more resilient than that of the blade. A suitable welding material is Inconel which comprises approximately two thirds nickel, one third chrome plus other metallic elements in small quantities.

When a set of blades are presented for repair (they may be in situ, for example, mounted on the rotor or a stator) it may first be ascertained whether the blades have been thermally hardened, for example by flame hardening or induction hardening.

For example, if the blade is made of relatively low carbon steel, e.g. 12% Cr, 1% C, such a blade would not be thermally hardened. However, if the blade has a relatively higher carbon content, for example 12% Cr, 2% C, it may be thermally hardened. Because such a blade may have a surface layer which gives hardness values which are inconsistent with the hardness of the main body of the blade, the blade is treated to remove a surface layer of, for example, 0.001"–0.002" thick. Removal of such a surface layer will remove any surface layer having a hardness which is greater than or less than the hardness of the main body of the blade due to, for example, a carburised or decarburised surface layer. The layer is removed in conventional manner by mechanical abrasion with, for example, grinding wheels and/or belt grinders.

Moreover, if the blade repair requires removal of blade material such as the removal of the material in the region 14 referred to above, or if material has to be ground away in the region of the crack, as shown at 112 above, so as to expose the interior of the blade, this removal is then performed.

Thereafter, a series of hardness tests are carried out over the blade including, if present, any regions exposed by removal of metal as mentioned above, so as to enable the hardness of the interior of the blade, as well as the exterior, to be determined.

The resultant hardness distribution pattern is then examined and any necessary heat treatment which is required prior to repair can be determined, for example to stress relieve any such thermally hardened blade.

The blade is then heat treated to stress relieve the blade and subsequently the blade is repaired and stress relieved again, if necessary. The or each stress relieving or other heating operation necessary on the blade is performed as hereinafter to be described.

Figure 4:
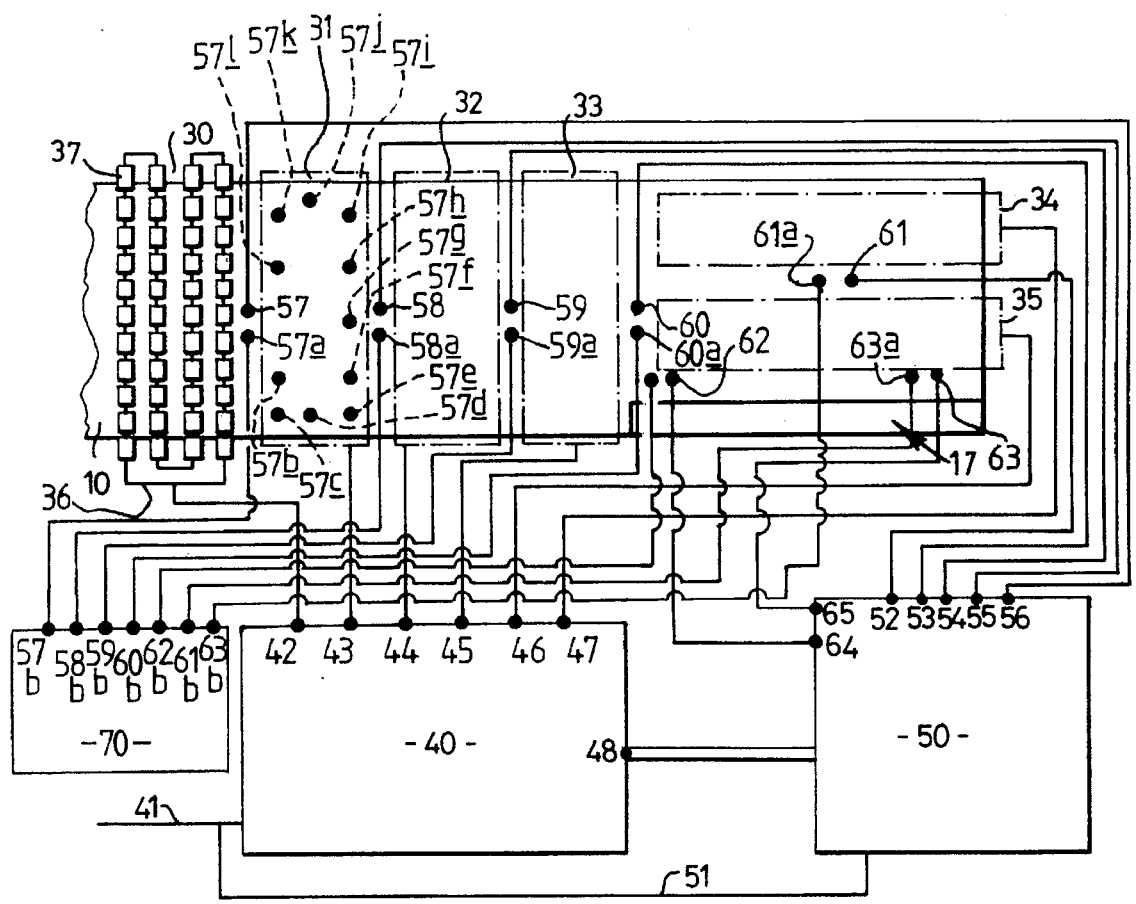
FIG. 4 is a diagrammatic illustration of the heating means for the turbine blade of FIG. 2.
Figure 5:
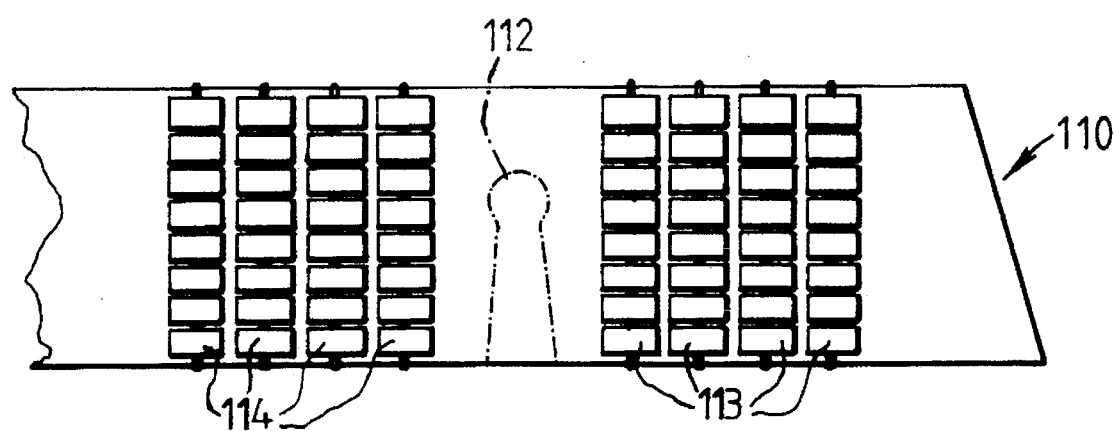
FIG. 5 is a similar view to that of FIG. 4 but in respect of the turbine blade shown in FIG. 3.

Referring now to FIG. 4 there is shown an end part of the turbine blade of FIG. 2 fitted with heating mats whereby a heating operation can be performed. In the illustrated example the mats are for pre-heating but essentially the same features as hereinafter to be described apply to any heating operation, although the details of mat size, capacity, position and the electrical energy input, may vary depending upon the particular heating operation to be performed, as well as blade size. FIG. 5 shows an end part of the blade of FIG. 3 similarly fitted with heating mats for the heating operation necessary for that mode of repair.

Referring now again to FIG. 4, the area of the blade surrounding the part to be repaired is covered or surrounded with heating mats 30, 31, 32, 33, 34 and 35. The heating mats may be of any suitable form and may comprise, as shown in the heating mat 30, a continuous conductor 36 passing through throughbores in a large number of ceramic beads 37.

Each of the heating mats 30 to 35 is controlled by a heating control circuit 40. The control circuit 40 has an input 41 to supply the electrical energy to all the heating elements such as the heating element 36 of the mat 30 and a plurality of outputs 42, 43, 44, 45, 46 and 47 so that the energy supplied to each of the heating mats 40 to 35 may be independently controlled. The heating control circuit 40 has an input 48 from master control unit 50. The master control unit 50 has a power supply 51 and is provided with inputs 52 to 56 from temperature sensing means 57 to 61 respectively.

Further temperature sensing means 62 and 63 may be provided which provide input signals to the master control circuit 50 at inputs 64 and 65 to alter the energisation of heating mats 30 to 35 should the actual temperature of the turbine blade sensed by sensors 62 and 63 immediately adjacent the area to be repaired either be above or below an expected value due to, for example, unexpected changes in ambient condition or the length of time taken to carry out the brazing or welding operation which may increase or decrease the expected temperature.

The temperature sensing means 57–61 may comprise thermocouples which may be welded to the blade.

When a set of blades for repair are presented for heating according to a predetermined heating regime (which may be for stress relief before and/or after repair, or preheating of the blade prior to repair, or heating during repair) a sample blade has applied thereto heating mats of a capacity, size and distribution which is expected to provide a desired heating distribution. If desired, two or more mats may be superimposed at any position on the blade where heat input requires this. The temperature sensing means 57–63 are connected to the master control unit 50 and at least one monitoring means 57a–63a is provided associated with each mat and preferably a plurality of monitoring means are provided for at least one of the mats such as the monitoring means 57a–57l shown associated with the mat 31. An electrical current of suitably adjusted current and voltage is then supplied to the mats by the unit 40 under the control of the control unit 50 and the resultant temperature distribution is determined by the monitoring means 57a–l, 58a–63a, the output of all of which can be recorded if desired, for example, using a chart recorder. When the heat treatment is to cause metallurgical change, for example if it is to be a stress relief heat treatment, the heat applied at this stage is less than that which will cause metallurgical change, for example 200°–300° C. The capacity, size, and distribution of the mats, as well as the electrical energy input, are adjusted as necessary empirically until the desired temperature distribution is achieved. Then the temperature is increased to that required to effect the necessary heat treatment then the blade temperature distribution is again monitored to ensure that the desired temperature distribution. is achieved. The relevant parameters of the heating means are noted as a heating specification.

The master control unit 50 can be programmed either manually or be supplied with recorded information from past analysis to control the signal supplied to input 48 of heating control circuit 40 so as to control each of the heating mats 30 to 35 with the amount of energy required to produce the desired temperature in the turbine blade 10.

Since ambient conditions may alter the actual temperature of the blade from the expected temperature given a predetermined amount of heat, sensors 57 to 61 can alter the signal produced by master unit 50 to heating control 40 so as to bring the temperature into line by altering the energisation of heating mats 30 to 35 to bring the temperature to its desired value.

After such heat treatment, if a stress relief or other heat treatment affecting the metallurgical properties of the material, the hardness of the blade may be again checked.

The relevant parameters of the heating means are noted as a heating specification.

Thereafter, all the blades, or at least a plurality of the blades presented for repair, are then heat treated, preferably at the same time, by replicating the heating specification that is by positioning similar mats in the same way and using the same electrical input to the mats as that used for the heat treatment of the sample blade. However, a plurality of monitoring means, such as the sensors 57a–l. are not necessary for each blade since it has been determined for the sample blade that the appropriate temperature distribution is achieved with the particular mat arrangement and energy input so long as the heating specification is replicated for all the blades.

However, if any of the heat sensors 57–63 or their associated circuitry were to fail, then incorrect input signals would be given to the master control circuit 50 so that the energisation of the heating mats 30–35 would be incorrectly controlled and accordingly a predetermined desired temperature distribution would not be achieved. This could lead to serious failure of the blade.

In order to overcome this problem, in accordance with the invention, a monitoring means is provided for each of the heat sensors 57–63.

The monitoring means comprises a single temperature sensitive device 57a–63a separate from the temperature sensing means constituting the heat sensors 57–63. The temperature sensitive devices may each comprise, for example, a thermocouple which may be welded to the blade. If desired, more than one such temperature sensitive device may be provided for each heat sensor 57–63.

The thermocouples are positioned adjacent a respective temperature sensing means 57–63 and are positioned in such proximity to the temperature sensitive means that the repeatability of temperature readings can be ensured. Typically, one of the positions used for a monitoring means such as the monitoring means 57a–l, 58a–63a is used, since the temperature at such location in relation to the respective temperature sensing means 57–63 is known.

Because of variations in metal thickness due, for example, to change in blade section, the temperature of the blade at said location adjacent the position of the temperature sensing means 57–63 may not be the same as at the respective positions. The temperature sensed by the monitoring means 57a–63a may be higher or lower than the temperature sensed by the associated temperature sensing means 57–63.

The monitoring means 57a–63a are connected to inputs 57b–63b respectively of a monitoring circuit 70.

The monitoring circuit 70 may be arranged to perform one or more of the following functions.

a) provide a display, or recording of the temperature sensed by each monitoring means 57a–63a.

b) a display or recording of this temperature but modulated by a predetermined amount so as to be corrected so as to reflect the temperature sensed by the associated temperature sensing means 57–63.

c) a thermal history by displaying, or recording, temperature against time. This may be done for a plurality of blades at the same time, e.g. on a multi-pen chart recorder.

d) an audible or visible warning, if the temperature sensed by any one or more of the monitoring means varies by a predetermined amount from the temperature which should be sensed if the temperature at the temperature sensing means is in the predetermined range.

e) an input signal to the master control unit 50 to disable the unit 50 to interrupt the heating operation after, for example, a time delay which may be 20–30 seconds, or otherwise to control the master control unit as desired.

f) utilise the monitoring means 57a–63a to control said application of heat.

Alternatively, instead of using the monitoring circuit for this latter function, the monitoring means 57a–63a may be manually connected to the master control unit 50 in place of an input 52–56 from a temperature sensing means 57–61 which has failed.

The monitoring means 57a–63a are positioned adjacent to and in proximity to the temperature sensing means 57–63 at predetermined positions, which positions generally have been predetermined on the basis of empirical tests, as described above, to ensure that the temperature sensed by the monitoring means accurately reflect either directly, or indirectly with a suitable adjustment factor, the temperature at the position of the associated temperature sensing means.

Accordingly, the monitoring means enables the temperature as sensed by each temperature sensing means to be checked so that failure of one or more of the temperature sensing means does not lead to incorrect heat treatment of the blade.

Referring now to FIG. 5, turbine blade 110 shown in FIG. 3 is provided with electrical heating elements 113, 114 which is supplied with current by a control unit similar to the master unit 50 under the control of sensing signals derived from temperature sensing means similar to the temperature sensing means 57–63 and monitored by monitoring means similar to the monitoring means 57a–63a described hereinbefore and connected to a monitoring circuit similar to the circuit 70 described hereinbefore.

After the blade has been heated for a sufficient length of time to achieve the desired temperature at different parts therealong (where heating is required prior to repair), the building up the new shield 17 to the turbine blade 10 by welding or other welding or brazing operation is performed. During this step in the repair which imparts a substantial thermal heat input to the blade, the heating mats 30 to 35 may be energised or, since the heat capacity of the blade may be considerable energisation may be terminated at this stage and the cooling process begun.

The blade may now be subjected to further heat treatment from the heating mats 30 to 35 such as a stress relief operation. In some cases it may be desirable to maintain a maximum heated temperature of the blade for a certain period of time and then gradually decrease the temperature of the blade over a predetermined time period.

A heating specification suitable for each heating operation is determined for a sample blade as necessary in a manner similar to that described above.

The hardness of a blade may be tested at each relevant stage, e.g. initially, after initial stress-relief, after repair and after further stress-relief, or after a desired one or combination of such steps. After final heat treatment the positions at which the temperature sensing means 57–63 and monitoring means 57a–l, 58a–63a have been welded to the blade are removed by mechanical abrasion. Moreover, if desired, a 0.001"–0.002" layer may be removed over the whole blade surface prior to final hardness testing.

Although, generally a heating specification is determined empirically, where blades to be heated are the same as, or are similar to previously heated blades, a previously known heating specification may be used for all the blades, with or without performing a trial on a sample blade. Further, if desired, in a suitable case, a heating specification may be calculated rather than empirically derived and such a calculated heating specification may be used for all the blades, with or without performing a trial on a sample blade.

It should be appreciated that the details of the heating means and their distribution and the distribution of the heat sensing means described hereinbefore are by way of example only, as are the modes of repair and the present invention can be applied to any heating operation involved in the repair of a turbine blade or like turbine component such as a stator blade, nozzle, bucket or the like, all of which, in the statements of invention hereof, are encompassed by the term "turbine blade".

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A method of repairing a turbine blade comprising performing a heating operation on the blade in which the blade is heated to achieve a predetermined temperature distribution, sensing the temperature of the blade at least at one position by temperature sensing means and controlling the application of heat in accordance with the temperature determined by said at least one sensing means and monitoring the temperature of the blade at a location adjacent said at least one position with a monitoring means, and repairing said turbine blade.

2. A method according to claim 1 wherein the method comprises the steps of applying heating means to selected areas of a turbine blade to be repaired, heating said areas of the turbine blade to desired temperatures, sensing the temperature of the blade at positions associated with said areas by respective temperature sensing means, and controlling the application of heat by said heating means in accordance with the temperature determined by the respective temperature sensing means and monitoring the temperature of the blade at a location adjacent each of said positions with said monitoring means.

3. A method according to claim 1 wherein the monitoring is performed with a temperature sensitive device separate from a temperature sensing means by which the temperature at said at least one position is sensed.

4. A method according to claim 1 wherein the monitoring comprises the manual monitoring of an indicating means.

5. A method according to claim 4 wherein the indicating means comprises at least one of an audible and a visible alarm signal.

6. A method according to claim 4 wherein the indicating means is activated as a result of the temperature sensitive device sensing that the temperature of the blade at said location lies outside said predetermined temperature distribution.

7. A method according to claim 1 wherein the monitoring means includes a visual display unit which indicates the temperature sensed by the monitoring means and/or provides a historic record of temperature displayed against time.

8. A method according to claim 1 wherein the monitoring means provides a control signal to a heating unit to disable or otherwise control the heating unit if the temperature sensed by the monitoring means lies outside predetermined range.

9. A method according to claim 1 wherein the monitoring means may be substituted for the temperature sensing means to control the application of heat.

10. A method according to claim 1 wherein the monitoring means is disposed in a predetermined relationship to said at least one temperature sensing means and the monitoring means is responsive to a temperature sensed by the monitoring means which is related to the temperature sensed by the associated sensing means in a predetermined manner.

11. A method according to claim 1 wherein the method of repair comprises welding or brazing cracks in a blade and/or re-building by welding or brazing and/or securing by welding or brazing a hard metal shield at the outer end of the leading edge of a turbine blade.

12. A method according to claim 1 wherein the method of repair comprises the steps of removing metal from the turbine blade in the area of a crack or other defect, replacing the removed material with metal in a fused state by a welding or brazing operation and/or by securing an insert of solid metal to the blade by a welding or brazing operation.

13. A method according to claim 1 wherein the blade is preheated in a controlled manner to a predetermined desired temperature before and/or during and/or after the repair operation.

14. A method according to claim 1 wherein, before or after the repair operation, heat is applied to the turbine blade and the turbine blade is maintained at a temperature, or a series of different temperatures, for a predetermined length of time such as to eliminate or substantially reduce, stress present in said blade.

15. A method according to claim 1 wherein the turbine blade is maintained at a predetermined temperature during the welding or brazing operation.

16. A method according to claim 1 including the step of removing a surface layer from at least part of the blade and then performing a hardness testing operation to determine a desired temperature distribution.

17. A method according to claim 16 wherein the blade has been thermally hardened prior to removing said surface layer.

18. A method according to claim 1 wherein a plurality of blades are repaired by first achieving a desired temperature distribution are for a sample blade by determining a heating specification by selecting, positioning and energizing at least one heating means on the sample blade and then applying a similar heating specification to each other blade.

19. A method according to claim 18 when the sample blade is provided with a plurality of monitoring means, at spaced positions thereon, associated with a single temperature sensing means and associated heating means, whilst each other blade is provided with a lesser number, preferably only one, monitoring means associated with a single temperature sensing means and associated heating means.

20. A method according to claim 1 wherein electrical heating means are provided to heat the turbine blade to the required temperature.

* * * * *